(12) United States Patent
Elling et al.

(10) Patent No.: US 8,904,125 B1
(45) Date of Patent: Dec. 2, 2014

(54) SYSTEMS AND METHODS FOR CREATING REFERENCE-BASED SYNTHETIC BACKUPS

(75) Inventors: Dean Elling, Burnsville, MN (US);
Aaron Laffin, Richfield, MN (US);
Xianbo Zhang, Madison, WI (US);
Mike Zeis, Minneapolis, MN (US)

(73) Assignee: Symantec Corporation, Mountain View, CA (US)

( * ) Notice: Subject to any disclaimer, the term of this patent is extended or adjusted under 35 U.S.C. 154(b) by 603 days.

(21) Appl. No.: 12/553,723

(22) Filed: Sep. 3, 2009

(51) Int. Cl.
*G06F 12/08* (2006.01)

(52) U.S. Cl.
USPC .................................. 711/162; 711/E12.103

(58) Field of Classification Search
USPC ......................................................... 711/162
See application file for complete search history.

(56) References Cited

U.S. PATENT DOCUMENTS

| 7,694,088 B1 | 4/2010 | Bromley et al. | |
| 2009/0182789 A1* | 7/2009 | Sandorfi et al. | 707/204 |

OTHER PUBLICATIONS

Dell Inc.; Incremental forever—Dell AppAssure Backup, Replication & Recovery: Continuous Backup for Windows Servers, VMware & Hyper-V; Dec. 4, 2010; http://www.appassure.com/incremental-forever/, as accessed Dec. 21, 2012.
Unitrends; Full-time protection. (A pink slip for your nightly backups.) Incremental backup with point-in-time recovery; Apr. 13, 20012; http://www.unitrends.com/features/incremental-forever.html, as accessed on Dec. 21, 2012.
Storagenewsletter.Com; Veeam Backup and Replication for Hyper-V Available as Expected . . . ; http://www.storagenewsletter.com/news/software/veeam-backup-replication-hyper-v; Dec. 1, 2011, as accessed on Dec. 21, 2012.
Jerome Wendt; Virtual Backup Appliances Get a Personality in Eversync 5.1; Feb. 5, 2013; Eversync; http://www.eversyncsolutions.com/blog/, as accessed on Feb. 5, 2013.
Sameer Mahajan et al.; Systems and Methods for Performing Incremental Backups; U.S. Appl. No. 13/363,982, Feb. 1, 2012.
Ashutosh Bahadure; Systems and Methods for Enabling Efficient Access to Incremental Backups; U.S. Appl. No. 13/873,211, filed Apr. 29, 2013.

* cited by examiner

*Primary Examiner* — Kenneth Lo
(74) *Attorney, Agent, or Firm* — ALG Intellectual Property, LLC (57) ABSTRACT

A computer-implemented method for creating reference-based synthetic backups. The method may include identifying a first set of references that identify data of a first backup. The first backup may represent at least a portion of a data set at a first time. The method may also include identifying a second set of references that identify data of a second backup. The second backup may represent changes made to the data set between the first time and a second time. The method may further include creating a synthetic backup that represents at least a portion of the data set at the second time by aggregating one or more references from the first set of references and one or more references from the second set of references. Various other methods, systems, and computer-readable media are also disclosed.

20 Claims, 6 Drawing Sheets

SYSTEMS AND METHODS FOR CREATING REFERENCE-BASED SYNTHETIC BACKUPS

BACKGROUND

Traditional backup systems may periodically create a full backup by capturing all allocated blocks (e.g., sectors or clusters) of a volume. Between full backups, a backup system may capture intermediate backups, referred to as incremental backups, which include blocks that have changed since the previous incremental or full backup. An incremental backup may be orders of magnitude smaller and faster than a full backup.

Unfortunately, some traditional backup technologies are not designed to effectively deal with long (or even short) chains of incremental backups. For example, some traditional backup systems may restore a volume (or any other backed-up entity) by opening and reading each backup in the entire chain of backups, including each incremental backup and a base backup (i.e., a full backup). An administrator may not be able to delete any of the backups until none of the backups in the chain are needed for possible restoration.

As an alternative to long chains of incremental backups, synthetic backups may be created at an intermediate point in a backup chain to allow older points in the chain to be deleted and to keep chain lengths short enough for efficient restoration. However, synthetic backup creation may involve significant back-end processing to move data from incremental backups to full backups. What is needed therefore is a more efficient and effective way to manage backup data.

SUMMARY

As will be described in greater detail below, the instant disclosure generally relates to systems and methods for creating reference-based synthetic backups. For example, a method may include identifying a first set of references that identify data of a first backup. The first backup may represent at least a portion of the data set at a first time. The method may also include identifying a second set of references that identify data of a second backup. The second backup may represent changes made to the data set between the first time and a second time. The method may further include creating a synthetic first backup that represents at least a portion of the data set at the second time by aggregating one or more references from the first set of references and one or more references from the second set of references.

In some embodiments, each reference in the first set of references may include a fingerprint of a portion of the first backup and each reference in the second set of references may include a fingerprint of a portion of the second backup. Additionally or alternatively, the first set of references may include one or more references to deduplicated data segments and the second set of references may include one or more references to deduplicated data segments.

According to at least one embodiment, creating the synthetic backup may include copying the second set of references to the synthetic backup and copying one or more references from the first set of references to the synthetic backup. The one or more references from the first set of references that are copied to the synthetic backup may consist of references to data that did not change between the first and second times.

In some embodiments, the method may include identifying a third set of references that identify data of a third backup. The third backup may represent changes made to the data set between the second time and a third time. In such embodiments, creating the synthetic backup may include copying the third set of references to the synthetic backup and copying one or more references from the second set of references to the synthetic backup. The one or more references from the second set of references that are copied to the synthetic backup may consist of references to data that did not change between the second and third times. Creating the synthetic backup may also include copying one or more references from the first set of references to the synthetic backup. The one or more references from the first set of references that are copied to the synthetic backup may consist of references to data that did not change between the first and third times.

According to various embodiments, the first backup and the second backup may be stored in a single instance storage system. In some embodiments, the method may include creating the first backup by backing up the data set at the first time and creating the first set of references by deduplicating the first backup. The method may also include creating the second backup by backing up data in the data set that changed between the first and second times and creating the second set of references by deduplicating the second backup.

In some embodiments, a backup system may create the first backup and the second backup. The backup system may also manage a catalog that comprises metadata associated with the first backup and the second backup. A deduplication system may deduplicate the first backup and the second backup. The deduplication system may also store single instances of the data in the first backup and the second backup. The deduplication system may further map the metadata associated with the first backup and the second backup with the references in the first and second set of references. In some embodiments, the method may include updating the catalog of the backup system to identify the synthetic backup.

In certain embodiments, a system may include at least one processor and an identification module programmed to direct the processor to identify a first set of references that identify data of a first backup. The first backup may represent at least a portion of the data set at a first time. The identification module may also be programmed to identify a second set of references that identify data of a second backup. The second backup may represent changes made to the data set between the first time and a second time. The system may further include a synthetic backup module programmed to direct the processor to create a synthetic backup that represents at least a portion of the data set at the second time by aggregating one or more references from the first set of references and one or more references from the second set of references.

In some embodiments, each reference in the first set of references may include a fingerprint of a portion of the first backup and each reference in the second set of references may include a fingerprint of a portion of the second backup. In various embodiments, the first set of references may include one or more references to deduplicated data segments and the second set of references may include one or more references to deduplicated data segments.

According to certain embodiments, the synthetic backup module may be programmed to create the synthetic backup by copying the second set of references to the synthetic backup and copying one or more references from the first set of references to the synthetic backup. The one or more references from the first set of references that are copied to the synthetic backup may consist of references to data that did not change between the first and second times.

In various embodiments, the identification module may be programmed to identify a third set of references that identify data of a third backup. In such embodiments, the third backup may represent changes made to the data set between the second time and a third time. The synthetic backup module may be programmed to create the synthetic backup by copying the third set of references to the synthetic backup and copying one or more references from the second set of references to the synthetic backup. The one or more references from the second set of references that are copied to the synthetic backup may consist of references to data that did not change between the second and third times. The synthetic backup module may also be programmed to create the synthetic backup by copying one or more references from the first set of references to the synthetic backup. The one or more references from the first set of references that are copied to the synthetic backup may consist of references to data that did not change between the first and third times.

The system may include a backup module programmed to direct the processor to create the first backup by backing up the data set at the first time, create the second backup by backing up data in the data set that changed between the first and second times, and manage a catalog that comprises metadata associated with the first backup and the second backup. The system may also include a deduplication module programmed to direct the processor to create the first set of references by deduplicating the first backup, create the second set of references by deduplicating the second backup, store single instances of the data in the first backup and the second backup, and map the metadata associated with the first backup and the second backup with the references in the first and second set of references. In some embodiments, the backup module may be programmed to direct the processor to update the catalog of the backup system to identify the synthetic backup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for creating reference-based synthetic backups. Embodiments of the instant disclosure may provide virtual synthetic full backups constructed from a full backup and one or more incremental backups. Alternatively, embodiments of the instant disclosure may create virtual synthetic incremental backups by combining one or more incremental backups. Some embodiments may use traditional backup catalog information and deduplication segment information to synthesize a synthetic backup through segment reference operations and without moving backup data. For example, a deduplication module may break up each backup in segments and create a fingerprint for each segment. The deduplication module may assemble a synthetic backup by manipulating fingerprints rather than reading all of the specified segment data and writing it back in the new file. Thus, deduplication software may provide an interface that significantly lowers the cost of synthetic backup creation by enabling creation of reference-based full backups, incremental backups, and other types of backups, as will be described in greater detail below.

Figure 1:
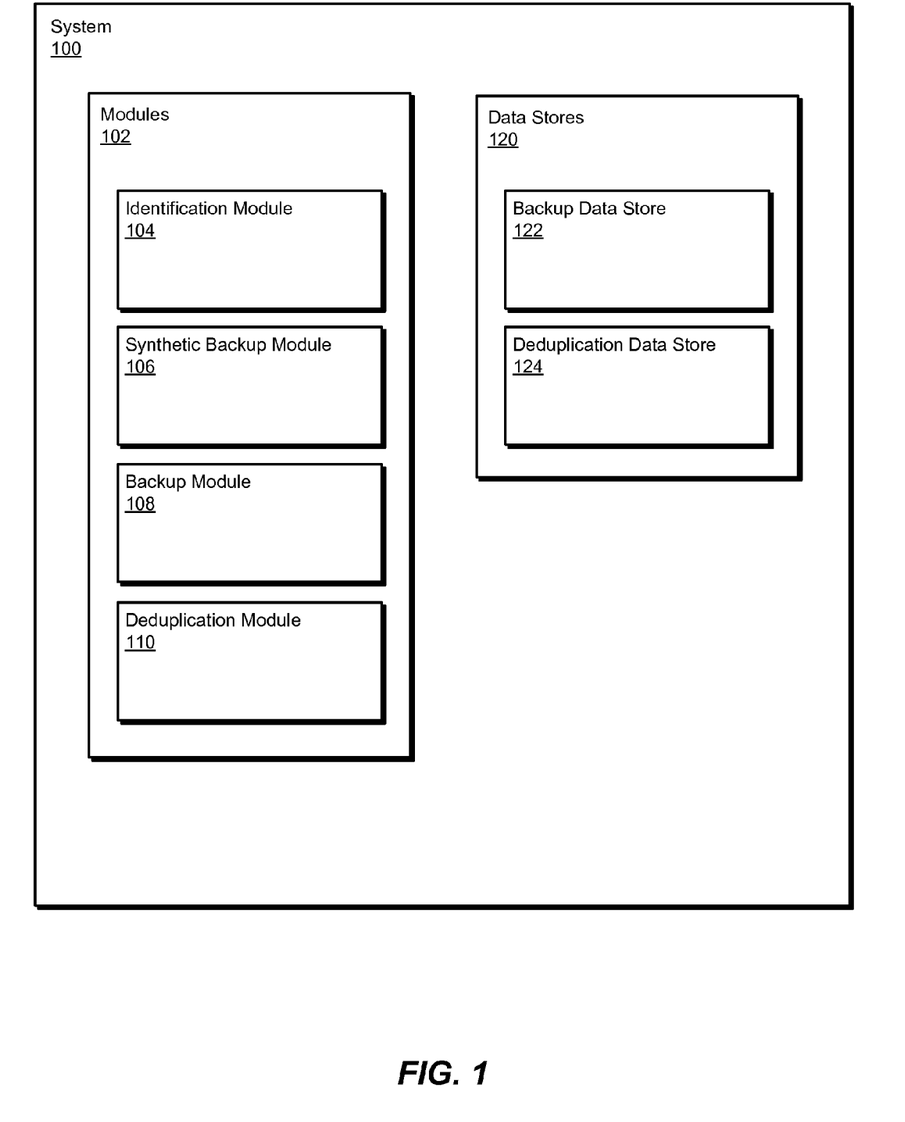
FIG. 1 is a block diagram of an exemplary system for creating reference-based synthetic backups.
Figure 2:
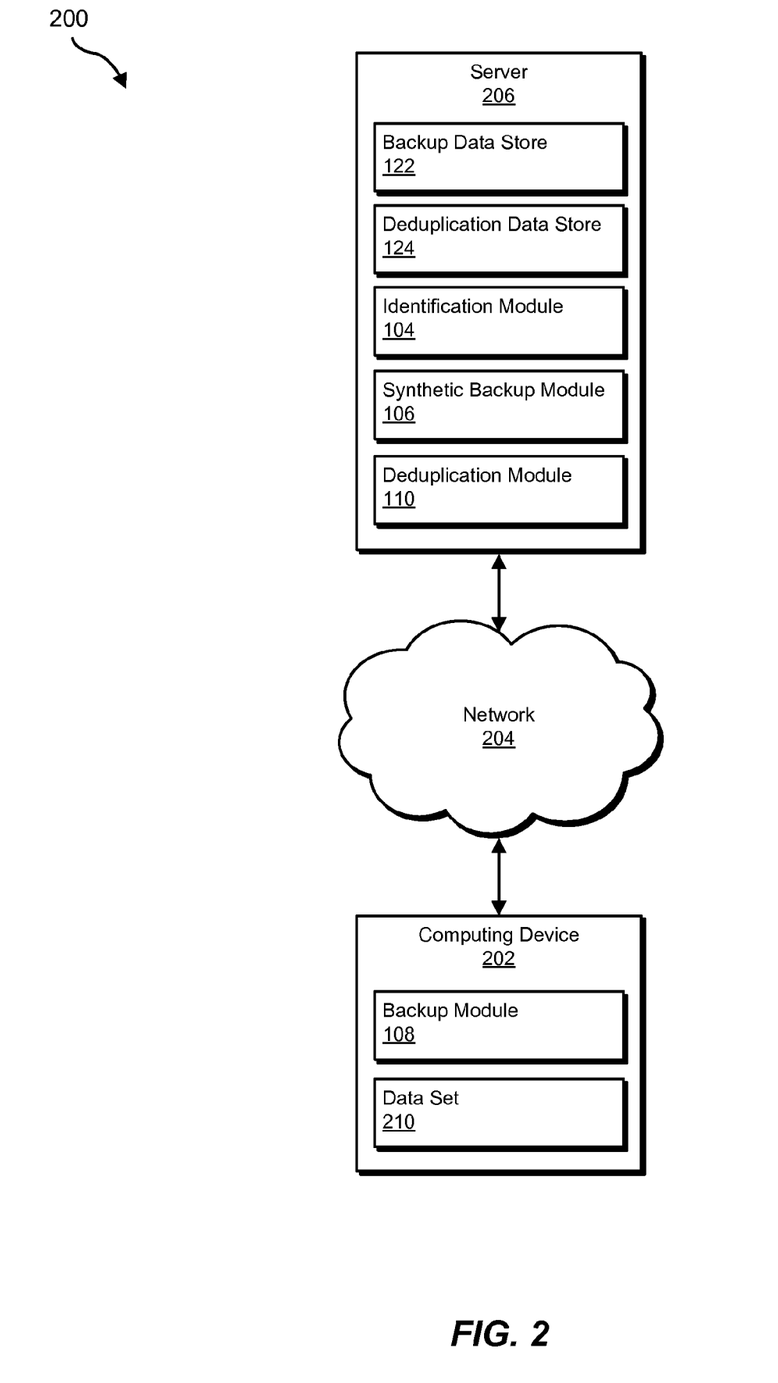
FIG. 2 is a block diagram of an exemplary system for creating reference-based synthetic backups.

The following will provide, with reference to FIGS. 1-2, detailed descriptions of exemplary systems for creating reference-based synthetic backups. Detailed descriptions of corresponding computer-implemented methods will also be provided in connection with FIGS. 3 and 4, and detailed descriptions of an exemplary reference-based synthetic backup will be provided in connection with FIG. 5. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for creating reference-based synthetic backups. As illustrated in this figure, exemplary system 100 may include one or more modules 102 for performing one or more tasks. For example, and as will be explained in greater detail below, exemplary system 100 may include an identification module 104 programmed to identify a first set of references that identify data of a first backup (the first backup may represent at least a portion of the data set at a first time). Identification module 104 may also be programmed to identify a second set of references that identify data of a second backup (the second backup may represent changes made to the data set between the first time and a second time).

Exemplary system 100 may also include a synthetic backup module 106 programmed to create a synthetic backup that represents at least a portion of the data set at the second time by aggregating one or more references from the first set of references and one or more references from the second set of references. In addition, and as will be described in greater detail below, exemplary system 100 may include a backup module 108 programmed to create the first backup by backing up the data set at the first time, create the second backup by backing up data in the data set that changed between the first and second times, and manage a catalog that comprises metadata associated with the first backup and the second backup. Furthermore, exemplary system 100 may include a deduplication module 110 programmed to create the first set of references by deduplicating the first backup, create the second set of references by deduplicating the second backup, store single instances of the data in the first backup and the second backup, and map the metadata associated with the first backup and the second backup with the references in the first and second set of references. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more data stores 120. Data stores 120 may represent portions of a single data store or computing device or a plurality of data stores or computing devices. In one embodiment, exemplary system 100 may include a backup data store 122 for storing backup data. In some embodiments, backup data store 122 may store backup metadata in a backup catalog. Exemplary system 100 may also include a deduplication data store 124, which may store deduplicated backup data, data objects that include references that identify deduplicated backup data, and mapping information that associates backup metadata with the references that identify deduplicated backup data.

Data stores 120 in FIG. 1 may represent a portion of one or more computing devices. For example, data stores 120 may represent a portion of server 206 in FIG. 2, computing system 510 in FIG. 5, and/or portions of exemplary network architecture 600 in FIG. 6. Alternatively, data stores 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing device 202 in communication with a server 206 via a network 204. In some embodiments, computing device 202 may be a device backed up by server 206, which may be a computing system that backs up data from one or more computing device.

In one embodiment, and as will be described in greater detail below, computing device 202 may include backup module 108 and a data set 210 that may be backed up by server 206. Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 may include backup data store 122, deduplication data store 124, identification module 104, synthetic backup module 106, and deduplication module 110. Examples of server 206 include, without limitation, one or more application servers and database servers configured to provide various database services and/or run certain software applications. For example, server 206 may include a backup system and a deduplication system.

While FIG. 2 shows backup module 108 on computing device 202, all or a portion of backup module 108 may be located on server 206. Similarly, while FIG. 2 shows deduplication module 110 on server 206, all or a portion of deduplication module 110 may be located on computing device 202.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
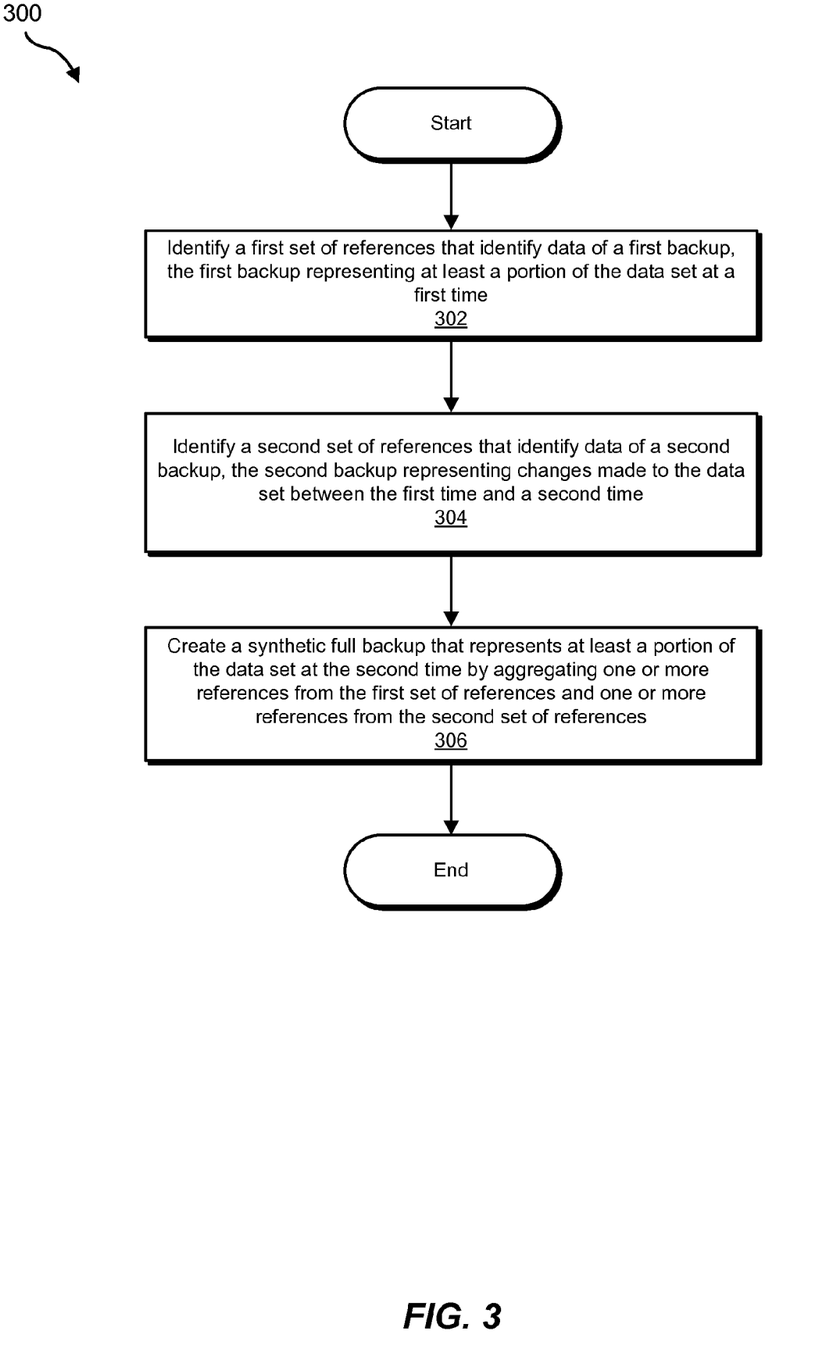
FIG. 3 is a flow diagram of an exemplary method for creating reference-based synthetic backups.

FIG. 3 is a flow diagram of an exemplary computer-implemented method 300 for creating reference-based synthetic backups. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may identify a first set of references that identify data of a first backup. For example, identification module 112 may, as part of server 206, identify a first set of references that identify data of a first backup of data set 210 that is stored in deduplication data store 124. The first backup may represent at least a portion of data set 210 at a first point in time. If the first backup is a full backup, the first backup may represent data set 210 at the first point in time. If the first backup is an incremental backup, the first backup may represent a portion of data set 210 at the first point in time.

The first set of references may be any set of information that identifies one or more portions of the first backup. The references in the first set of references may identify any portion of a first backup. For example, the references may identify a segment of the first backup, a file in the first backup, and/or any other portion of the first backup. As used herein, the term "references" may refer to indexes, pointers, fingerprints, hashes, and/or any other information that may be used to identify data units.

In some embodiments, the set of references may be a concatenation of data segment fingerprints of fixed sized data segments. Alternatively, the set of references may be a concatenation of data segment fingerprints and segment size values of variable sized data segments. Additionally or alternatively, the set of references may be a concatenation of data segment fingerprints, segment offset values, and segment size values of variable sized data segments. In some embodiments, the first set of references may be included in a deduplication system data object that represents the first backup.

The first backup may be a full backup or an incremental backup. As used herein, the phrase "full backup" generally refers to any data backup that includes each data unit (e.g., block, sector, cluster, file, etc.) in a set of data units. For example, a full backup of a volume may include each block in the volume. In some embodiments, a full backup may include only those files which have been identified for backup, which means that a full backup may include a subset of the data on a system or volume. In other embodiments, a full backup may include a copy of all data and/or software on a system. For example, a full backup may include an entire data store, regardless of whether or not that data has been changed since a previous backup was performed. A full backup may include all data needed for a complete system restoration. A full backup may be a starting point for other backups (e.g., incremental backups).

As used herein, the phrase "incremental backup" generally refers to any data backup that includes less than every data unit (e.g., segment, block, sector, cluster, file, etc.) in a set of data units. For example, an incremental backup may only include data units that have changed since a previous point in time (e.g., the time a previous full backup or other incremental backup was taken). In other words, an incremental backup may only include data that has changed (e.g., data that has been modified, added, deleted, etc.) since a previous backup.

As noted, the first backup may be a backup of a data set. As used herein, the phrase "data set" generally refers to any set of one or more data units. For example, a data set may include any set of one or more units of data that may be backed up to server 206. A set of data units may include any physical and/or logical storage entity. For example, a set of data units may include a volume, a physical disk, a virtual disk, a partition on a drive, a set of one or more data entities (e.g., files, blocks, clusters, sectors), and/or any other data storage area.

At step 304 in FIG. 3, one or more of the systems described herein may identify a second set of references that identify data of a second backup (e.g., an incremental backup). For example, identification module 104 may, as part of server 206, identify a second set of references that identify data of a second backup of data set 210 that is stored in deduplication data store 124. The second set of references may be configured in any of the ways presented in the discussion of the first set of references. For example, each reference in the second set of references may be a fingerprint that identifies a portion of the second backup. In some embodiments, each reference in the second set of references may be a reference to a deduplicated data segment of the second backup.

At step 306 in FIG. 3, one or more of the systems described herein may create a synthetic backup that represents at least a portion of the data set at the second time by aggregating one or more references from the first set of references and one or more references from the second set of references. For example, synthetic backup module 106 may create a full synthetic backup that represents data set 210 at the second point in time. Alternatively, synthetic backup module 106 may create an incremental synthetic backup that represents a portion of data set 210 at the second point in time.

The synthetic backup may be created by aggregating references from the first and second sets of references in any suitable manner. As used herein, the phrase "aggregating references" generally refers to any process for collecting, combining, or otherwise associating references with each other.

In some embodiments, the synthetic backup may be created by first creating a new data object (e.g., a deduplication data object). Then, synthetic backup module 106 may copy the second set of references to the new data object. Synthetic backup module 106 may also copy one or more references from the first set of references to the synthetic backup. The one or more references from the first set of references that are copied to the synthetic backup may consist of references to data that did not change between the first and second times. For example, synthetic backup module 106 may copy to the new data object only the references from the first set of references that do not point to the same data units as the references in the second set of references.

In some embodiments, synthetic backup module 106 may use a backup catalog created by a backup system to identify the data that did not change between the first and second times. Such a backup catalog may contain metadata that identifies the data of the first backup and the second backup.

The previous example shows how one backup (e.g., a full or incremental backup) may be combined with a subsequent backup (e.g., an incremental backup) to create a synthetic backup. In other embodiments, any number of incremental backups may be combined with a previous full or incremental backup to create a synthetic backup. For example, in addition to identifying the first and second sets of references, identification module 104 may identify a third set of references that identify data of a third backup. The third backup may include data from the data set that has changed between the second time and a third time. In such embodiments, creating the synthetic backup may include copying the third set of references to the synthetic backup and copying one or more references from the second set of references to the synthetic backup. The one or more references from the second set of references that are copied to the synthetic backup consist of references to data that did not change between the second and third times. Creating the synthetic backup may also include copying one or more references from the first set of references to the synthetic backup. The one or more references from the first set of references that are copied to the synthetic backup consist of references to data that did not change between the first and third times.

In some embodiments, a synthetic backup may replace incremental backups that are used to create the synthetic backup. For example, the synthetic backup may be created by combining references from data objects that include references to data of the first, second, and third backups, and the data objects that include references to data of the second and third backups may be deleted after the synthetic backup is created if the second and third backups are incremental backups. Alternatively, the data objects that include references to data of the second and third backups may not be deleted after the synthetic backup is created.

As used herein, the phrase "synthetic backup" generally refers to any full or incremental backup of a data set that is created by combining references to data of at least one incremental backup with references to data of at least one other incremental or full backup. Thus, a synthetic backup may be created by moving references rather than the data represented by the references, which may be much more efficient than moving the data itself.

Figure 4:
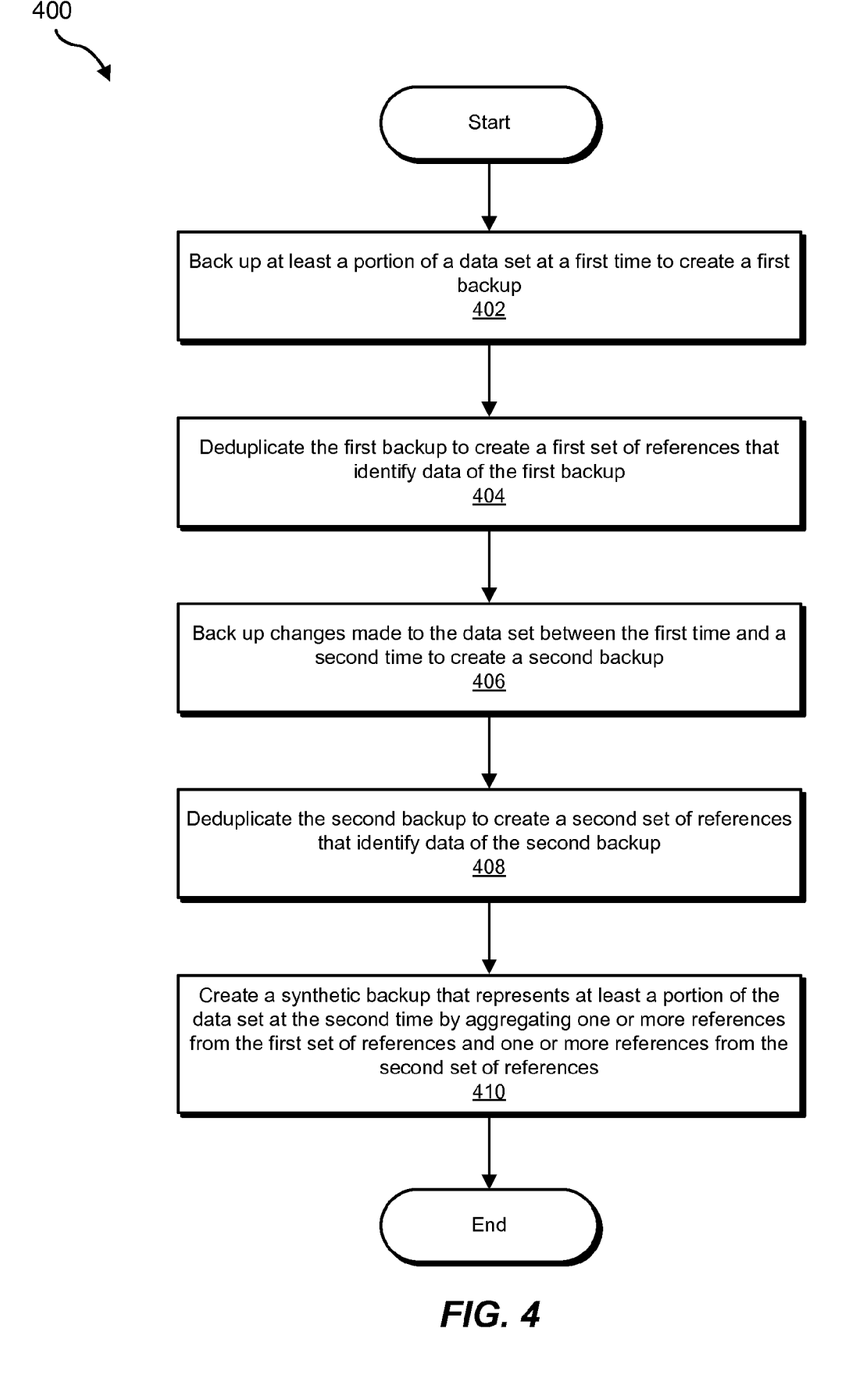
FIG. 4 is another flow diagram of an exemplary method for creating reference-based synthetic backups.

In some embodiments, the backups may be stored in a single instance storage system. FIG. 4 is a flow diagram of an exemplary computer-implemented method 400 for creating reference-based synthetic backups within a single instance storage system. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

At step 402 in FIG. 4, one or more of the systems described herein may back up at least a portion of a data set at a first time to create a first backup. For example, backup module 108 may create a first backup of data set 210 in FIG. 2 and store the first backup in backup data store 122 and/or deduplication data store 124. While backup module 108 is shown on computing device 202 in FIG. 2, all or a portion of backup module 108 may also be located on server 206. Computing device 202 may coordinate with server 206 to transfer data to backup data store 122 and to create a first backup of data set 210. A first backup of data set 210 may be created using any suitable data backup technology.

At step 404 in FIG. 4, one or more of the systems described herein may deduplicate the first backup to create a first set of references that identify data of the first backup. For example, deduplication module 110 may deduplicate a first backup of data set 210. While FIG. 2 shows deduplication module 110 on server 206, all or a portion of deduplication module 110 may be located on computing device 202. Thus, deduplication module 110 may perform one or more client-side deduplication operations and/or one or more server-side deduplication operations.

Deduplication module 110 may deduplicate data in deduplication data store 124, which may also be referred to as a Single Instance Storage ("SIS") data store. Deduplication data store 124 may include one or more collections of single-instance data, such as a single-instance database, for example. As used herein, "single-instance data" generally refers to non-duplicate data. Hence, deduplication data store 124 may be configured to store only non-redundant instances of data. Deduplication module 110 may perform data deduplication in order to prevent data from being redundantly stored to deduplication data store 124.

As used herein, "deduplication" may refer to one or more operations related to reducing the amount of storage space used in a single-instance data storage system, including operations for detecting and preventing data from being redundantly stored to the single-instance data storage system. Deduplication may be performed using any suitable deduplication technology or algorithm.

The following is an example of how exemplary system 200 may be used to perform data deduplication in order to backup data from data set 210 located on computing device 202 to deduplication data store 124. In this example, data from data set 210 may be marked for storage (e.g., backup) to deduplication data store 124 of server 206. The data may comprise a data set (e.g., a logical set of files and/or directories) marked for storage to deduplication data store 124 of server 206.

The data may be any data from data set 210 and may include any type of data. For example, data set 210 may include data files, media files, and executable files, such as those used to implement software applications and operating systems, as well as files that are used or generated by such executable files, including files generated by user applications (e.g., word processing programs, email programs, graphics programs, database applications, or the like) executing on a client of a deduplication system. As another example, data set 210 may include data in a registry and/or file system of a computing device.

The phrase "marked for storage" may refer to current and/or scheduled future events for storing data to deduplication data store 124. For instance, a user may mark data for current backup and/or scheduled future backup. A scheduled backup may include a one-time backup of the data scheduled at a future date and/or a schedule of recurring periodic backups of the data. A request to store the data in deduplication data store 124 located on server 206 may be initiated by a user of computing device 202 marking the data for storage (e.g., backup) to deduplication data store 124 or by initiation of a scheduled storage event. In some embodiments, an initiation of a request to store data to server 206 may launch one or more data deduplication operations.

Although not shown in FIG. 2, in order to facilitate client-side deduplication, computing device 202 and/or server 206 may be configured to maintain client-side fingerprint caches. A fingerprint cache may represent a collection of one or more fingerprints associated with a data selection, such as a data selection stored or marked for storage to deduplication data store 124. A fingerprint cache may represent one or more versions of a collection of fingerprints, including versions of the collection of fingerprints before, during, and/or after performance of one or more data deduplication operations. As an example, a fingerprint cache may represent a collection of fingerprints associated with a previous storage event (e.g., a first backup and/or an incremental backup).

At step 406 in FIG. 4, one or more of the systems described herein may back up changes made to the data set between the first time and a second time to create a second backup (e.g., an incremental backup). For example, backup module 108 may identify one or more data units in data set 210 that have been modified since the first time. Backup module 108 may determine which data units in data set 210 have changed in a variety of ways. In some embodiments, backup module 108 may determine which data units in data set 210 have been modified by tracking modifications to data set 210. Additionally or alternatively, backup module 108 may read archive bits or timestamps associated with files in data set 210 to determine whether the files have changed since the most recent first backup. As used herein, the phrase "changes made to a data set" may refer to any data unit in a data set in which all, or any portion, of data in the data unit has been changed, added, deleted, rewritten, or otherwise modified.

At step 408 in FIG. 4, one or more of the systems described herein may deduplicate the second backup to create a second set of references that identify data of the second backup. For example, deduplication module 110 may deduplicate data of the second backup. The second backup may be deduplicated using any suitable deduplication process, such as the deduplication process presented in the description of step 404 above.

At step 410 in FIG. 4, one or more of the systems described herein may create a synthetic backup that represents at least a portion of the data set at the second time by aggregating one or more references from the first set of references and one or more references from the second set of references. Step 410 in FIG. 4 is similar to step 306 in FIG. 3 and may be performed by any of the processes discussed in step 306 of FIG. 3.

In some embodiments, the synthetic backup may be created by using catalog data from a backup system (e.g., from backup data store 122) and deduplication data from a deduplication system (e.g., from deduplication data store 124). A backup catalog may include information (e.g., metadata) about one or more files or other data units backed up through the backup system.

The following is an example of how a backup system and a deduplication system may cooperate to create a synthetic backup. The backup system may create a full backup, a first incremental backup, and a second incremental backup. The deduplication system may deduplicate the data of the full backup, the first incremental backup, and the second incremental backup. The backup system may store metadata associated with the backed up data in a backup catalog, and the deduplication system may store the deduplicated data and a data object for each backup. A full backup data object may include references to the deduplicated data of the first backup, a first incremental backup data object may include references to the deduplicated data of the first incremental backup, and a second incremental backup data object may include references to the deduplicated data of the second incremental backup.

To create the synthetic backup, synthetic backup module 106 may identify the deduplication data objects for each backup. Synthetic backup module 106 may copy the contents of the second incremental data object to a new data object that represents the synthetic backup. Synthetic backup module 106 may then use the backup catalog to identify data units that did not change between the time of the first incremental backup and the time of the second incremental backup (i.e., data units that are not included in the second incremental backup). For each such data unit, synthetic backup module 106 may copy a corresponding reference from the first incremental data object to the new data object (i.e., the synthetic backup data object).

Synthetic backup module 106 may then use the backup catalog to identify data units that did not change between the time of the full backup and the time of the first incremental backup (i.e., data units that are not included in the first or second incremental backups). For each such data unit, synthetic backup module 106 may copy a corresponding reference from the full backup data object to the synthetic backup data object. The deduplication system may store the synthetic backup data object as a full backup that represents the backed-up data set at the time the third backup was taken. Similarly, the backup system may update its catalog to identify the synthetic backup. Thus, the backup system may present a new first backup image to users.

Figure 5:
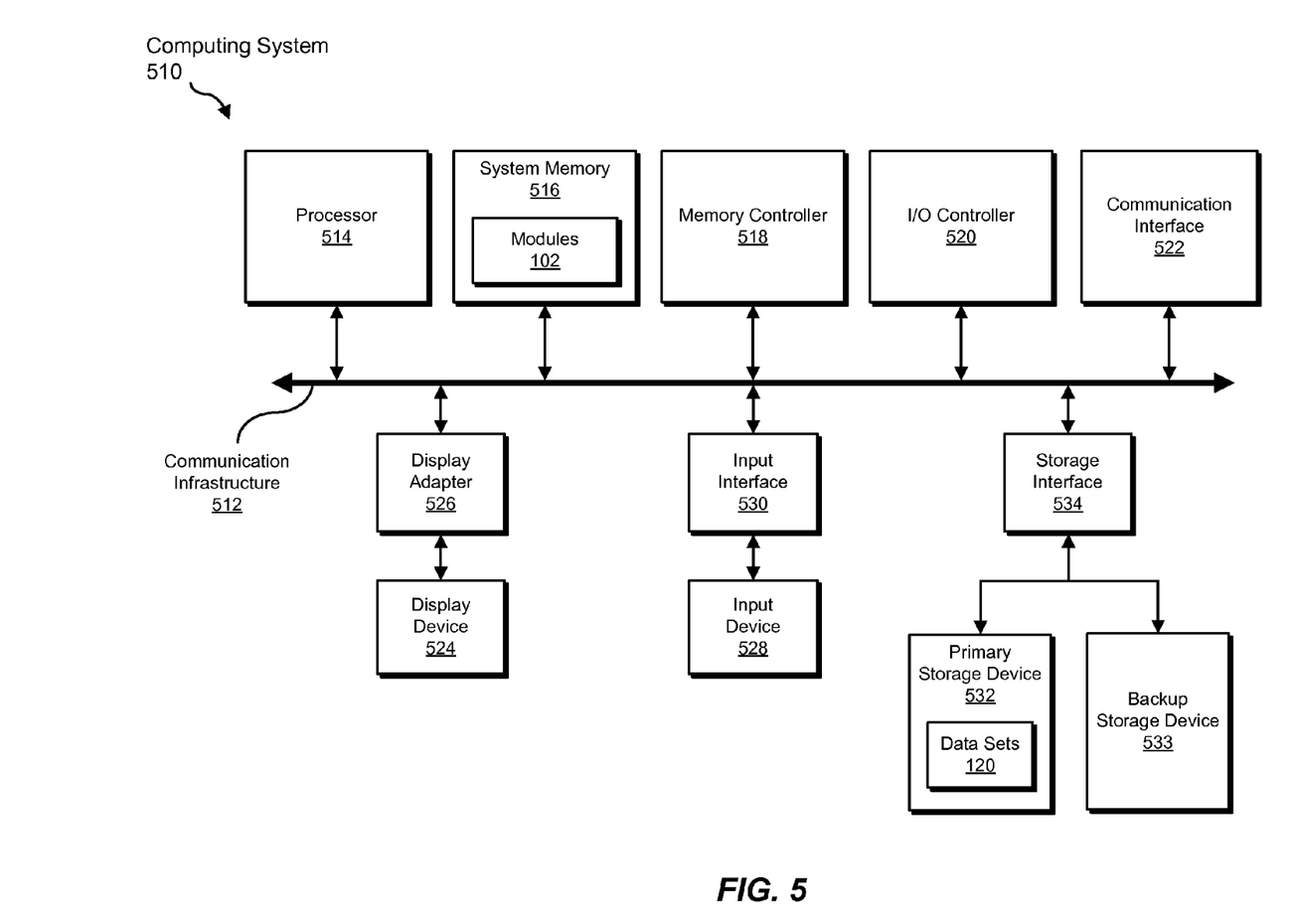
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, creating, copying, managing, storing, mapping, deduplicating, and backing up steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, creating, copying, managing, storing, mapping, deduplicating, and backing up.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, creating, copying, managing, storing, mapping, deduplicating, and backing up steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, creating, copying, managing, storing, mapping, deduplicating, and backing up steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, creating, copying, managing, storing, mapping, deduplicating, and backing up steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data sets 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, creating, copying, managing, storing, mapping, deduplicating, and backing up steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
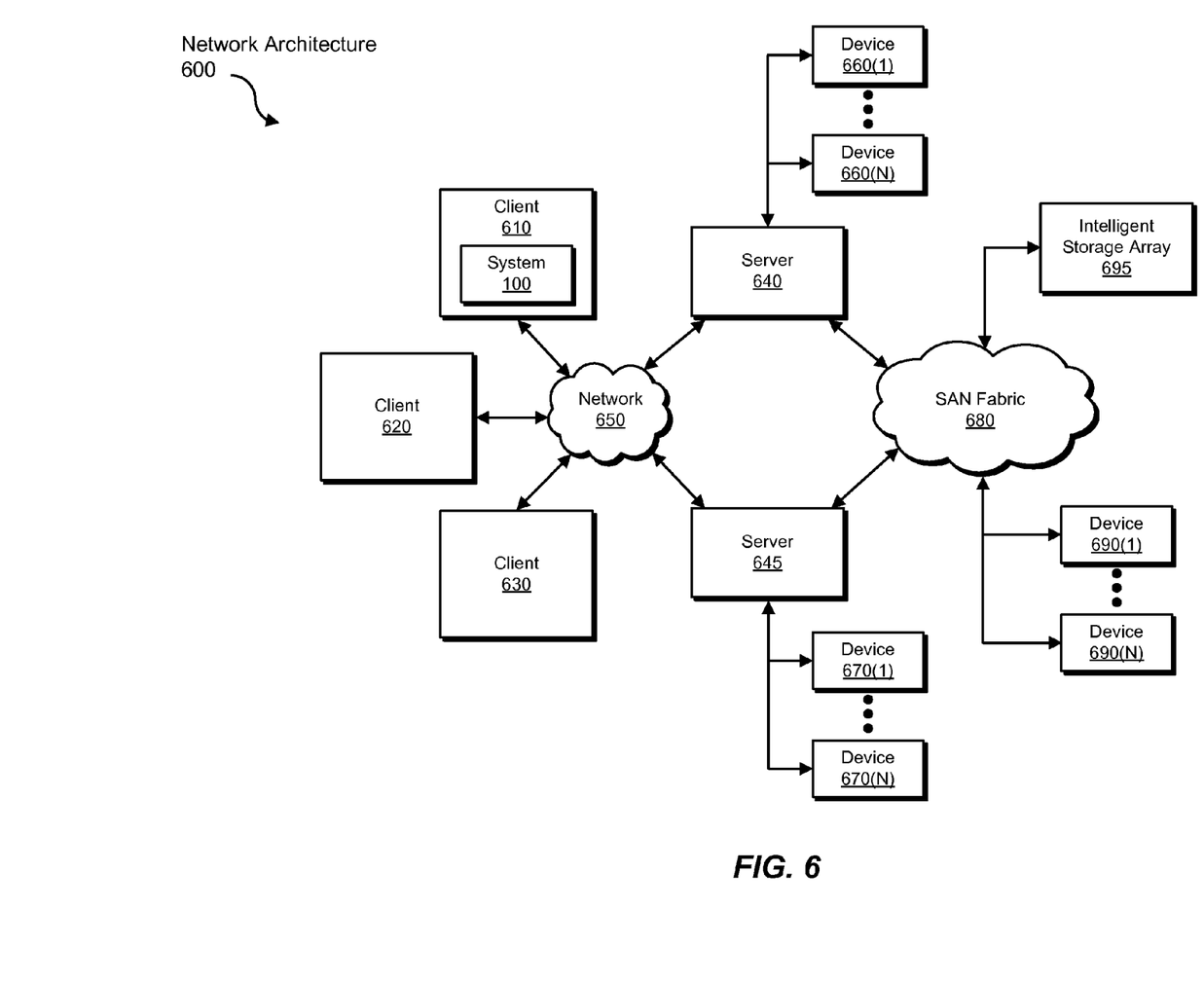
FIG. 6 is a block diagram of an exemplary network architecture capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, creating, copying, managing, storing, mapping, deduplicating, and backing up steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for creating reference-based synthetic backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules described herein may transform a first backup and one or more incremental backups into a synthetic backup.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating reference-based synthetic backups, at least a portion of the method being performed by a computing device comprising at least one processor, the method comprising:
storing metadata associated with a first backup and a second backup in a backup system catalog;
deduplicating the first backup to create a first deduplicated data object that comprises a first set of fingerprints that identify deduplicated data segments of the first backup stored within a deduplication system, the first backup representing at least a portion of a data set at a first time;
using the backup system catalog to identify data units that did not change between the first time and a second time;
for each data unit that did not change between the first time and the second time, copying a corresponding fingerprint from the first set of fingerprints to a synthetic backup data object;
deduplicating the second backup to create a second deduplicated data object that comprises a second set of fingerprints that identify deduplicated data segments of the second backup stored within the deduplication system, the second backup representing changes made to the data set between the first time and the second time;
creating a synthetic backup that represents at least a portion of the data set at the second time by:
mapping the metadata in the backup system catalog associated with the first backup and the second backup with the first and second set of fingerprints stored in the deduplication system;
copying, from the second deduplicated data object to the synthetic backup data object, the second set of fingerprints within the second deduplicated data object.

2. The method of claim 1, wherein the synthetic backup is created by manipulating fingerprints without reading or writing backup data identified by the fingerprints.

3. The method of claim 1, wherein the synthetic backup is created by manipulating fingerprints without moving backup data identified by the fingerprints.

4. The method of claim 1, wherein the synthetic backup is created using data unit reference operations such that the synthetic backup is created without moving backup data.

5. The method of claim 1, further comprising deduplicating a third backup to create a third set of fingerprints that identify data of the third backup, wherein creating the synthetic backup comprises copying the third set of fingerprints to the synthetic backup.

6. The method of claim 1, wherein:
the first and second backups are stored in a single instance storage system.

7. The method of claim 1, further comprising:
creating the first backup by backing up the data set at the first time;
creating the second backup by backing up data in the data set that changed between the first and second times.

8. The method of claim 7, wherein:
the backup system manages the backup system catalog;
the deduplication system stores single instances of the data in the first and second backups.

9. The method of claim 8, further comprising:
updating the backup system catalog of the backup system to identify the synthetic backup.

10. The method of claim 1, wherein the first backup comprises a full backup.

11. The method of claim 10, wherein the second backup comprises an incremental backup.

12. A system for creating reference-based synthetic backups, the system comprising:
at least one processor;
a backup module programmed to direct the processor to store metadata associated with a first backup and a second backup in a backup system catalog;
a deduplication module programmed to direct the processor to:
deduplicate the first backup to create a first deduplicated data object that comprises a first set of fingerprints that identify deduplicated data segments of the first backup stored within a deduplication system, the first backup representing at least a portion of a data set at a first time;
deduplicate the second backup to create a second deduplicated data object that comprises a second set of fingerprints that identify deduplicated data segments of the second backup stored within the deduplication system, the second backup representing changes made to the data set between the first time and a second time;
a synthetic backup module programmed to direct the processor to create a synthetic backup that represents at least a portion of the data set at the second time by:
for each data unit that did not change between the first time and the second time, copying a corresponding fingerprint from the first set of fingerprints to a synthetic backup data object;
mapping the metadata in the backup system catalog associated with the first backup and the second backup with the first and second set of fingerprints stored in the deduplication system;
copying, from the second deduplicated data object to the synthetic backup data object, the second set of fingerprints within the second deduplicated data object.

13. The system of claim 12, wherein the synthetic backup is created by manipulating fingerprints without reading or writing backup data identified by the fingerprints.

14. The system of claim 12, wherein the synthetic backup is created by manipulating fingerprints without moving backup data identified by the fingerprints.

15. The system of claim 12, wherein the synthetic backup is created using data unit reference operations such that the synthetic backup is created without moving backup data.

16. The system of claim 12, wherein:
the deduplication module is further programmed to deduplicate a third backup to create a third set of fingerprints that identify data of the third backup;
the synthetic backup module is programmed to create the synthetic backup by copying the third set of fingerprints to the synthetic backup.

17. The system of claim 12, wherein:
the backup module is programmed to direct the processor to:
create the first backup by backing up the data set at the first time;
manage the backup system catalog;
the deduplication module is programmed to direct the processor to store single instances of the data in the first backup and the second backup.

18. The system of claim 17, wherein:
the backup module is programmed to direct the processor to update the backup system catalog to identify the synthetic backup.

19. A non-transitory computer-readable-storage medium comprising one or more computer-executable instructions that, when executed by at least one processor of a computing device, cause the computing device to:
- store metadata associated with a first backup and a second backup in a backup system catalog;
- deduplicate the first backup to create a first deduplicated data object that comprises a first set of fingerprints that identify deduplicated data segments of the first backup stored within a deduplication system, the first backup representing at least a portion of a data set at a first time;
- use the backup system catalog to identify data units that did not change between the first time and a second time;
- for each data unit that did not change between the first time and the second time, copy a corresponding fingerprint from the first set of fingerprints to a synthetic backup data object;
- deduplicate the second backup to create a second deduplicated data object that comprises a second set of fingerprints that identify deduplicated data segments of the second backup stored within the deduplication system, the second backup representing changes made to the data set between the first time and the second time;
- create a synthetic backup that represents at least a portion of the data set at the second time by:
  - mapping the metadata in the backup system catalog associated with the first backup and the second backup with the first and second set of fingerprints stored in the deduplication system;
  - copying, from the second deduplicated data object to the synthetic backup data object, the second set of fingerprints within the second deduplicated data object.

20. The non-transitory computer-readable-storage medium of claim 19, wherein the one or more computer-executable instructions further cause the computing device to update the backup system catalog to identify the synthetic backup.

\* \* \* \* \*